US010511866B1

United States Patent
Boyd et al.

(10) Patent No.: US 10,511,866 B1
(45) Date of Patent: Dec. 17, 2019

(54) SYSTEMS AND METHODS FOR OBTAINING AND DISPLAYING VIDEOS

(71) Applicant: LongTail Ad Solutions, Inc., New York, NY (US)

(72) Inventors: Eric Boyd, Brooklyn, NY (US); Brian Rifkin, New York, NY (US); Robert Walch, New York, NY (US)

(73) Assignee: Longtail Ad Solutions, Inc., New York, NY (US)

( * ) Notice: Subject to any disclaimer, the term of this patent is extended or adjusted under 35 U.S.C. 154(b) by 0 days.

(21) Appl. No.: 16/225,575

(22) Filed: Dec. 19, 2018

(51) Int. Cl.
*H04N 21/234* (2011.01)
*H04N 21/2547* (2011.01)
*G06Q 30/02* (2012.01)

(52) U.S. Cl.
CPC ... *H04N 21/23424* (2013.01); *G06Q 30/0275* (2013.01); *H04N 21/2547* (2013.01)

(58) Field of Classification Search
CPC ........ A63F 9/24; G07F 17/32; G07F 17/3244; G07F 17/326; G07F 17/3295; G06Q 30/02; G06Q 30/0254; G06Q 30/0275; H04N 21/23424; H04N 21/2547
See application file for complete search history.

(56) References Cited

U.S. PATENT DOCUMENTS

| | | |
|---|---|---|
| 2002/0013757 A1 | 1/2002 | Bykowsky et al. |
| 2010/0145809 A1 | 6/2010 | Knapp et al. |
| 2011/0231242 A1 | 9/2011 | Dilling et al. |
| 2015/0066639 A1 | 3/2015 | Knapp et al. |
| 2015/0128162 A1* | 5/2015 | Ionescu ............... H04N 21/6125 725/14 |
| 2017/0161793 A1* | 6/2017 | Knapp .................... G06Q 30/02 |
| 2019/0098344 A1* | 3/2019 | Shanson .......... H04N 21/23424 |

OTHER PUBLICATIONS

U.S. Office Action for U.S. Appl. No. 16/225,614 dated Apr. 2, 2019.

* cited by examiner

*Primary Examiner* — Omar S Parra
(74) *Attorney, Agent, or Firm* — FisherBroyles, LLP

(57) ABSTRACT

Systems and methods for obtaining and playing video advertisements in conjunction with play of video content make use of partner advertising providers to reduce the time required to identify and obtain the video advertisements. An instantiation of a video player software application receives and analyzes bids from partner advertising providers and selects a winning bid before a user issues a play command. As a result, it is often possible to immediately begin playing a video advertisement the instant the user issues a play command.

30 Claims, 9 Drawing Sheets

SYSTEMS AND METHODS FOR OBTAINING AND DISPLAYING VIDEOS

BACKGROUND

It is now common for a website to offer video content to the users viewing the website. Typically, a page of a website will include one or more embedded video players, and each of the embedded video players is configured to play a different video. A user initiates playback of a video by issuing some positive play intent action, such as clicking on a play button of the video player.

In many instances, the website publisher who creates a website derives revenue not from use of the website, but rather from advertisers who place advertisements on the website. In the past, most advertising was in the form of display or banner advertisements. Display or banner advertisements could be positioned at various locations on a page of a website. If a user viewing the website wished to obtain more information about an advertisement, the user would typically select or click upon the display advertisement, and the user's browser would then navigate to and load a website run by the advertiser.

In many instances, a website publisher will subscribe to an advertising service to obtain advertisements that are then displayed on the publisher's website. Thus, many website publishers do not have individual contracts with the advertisers themselves, but rather obtain advertisements through an advertising service. The advertising service, in turn, sets up relationships with a large number of different advertisers and essentially acts as a middleman between website publisher and the advertisers.

When a user navigates to particular webpage, browser software on the user's computer will render the webpage on the user's display based upon computer code embedded in the webpage. The user typically does not see the embedded computer code that enables the browser to render the webpage. However, the browser software application uses the embedded computer code to determine what to display to the user.

If a website publisher decides to place one or more advertisements on a webpage, the website publisher can include embedded computer code in a header of the webpage that dictates where the advertisements will be placed, the size of the advertisements, and various other information. The browser software utilizes the embedded computer code relating to the advertisements to request advertisements from an advertising service. When an advertising service receives such a request, the request may include information about what will be presented on the webpage. This allows the advertiser to seek out advertisements that are relevant to the content of the webpage which is being rendered.

In some instances, the advertising service might seek bids from multiple different advertisers, asking if they would like to place an advertisement on the webpage that is being rendered by the browser software. The request for a bid may include information about the content of the webpage being rendered that was originally provided to the advertising service by the browser software. If the advertising service requests bids, various advertisers would provide bids that indicate the prices the respective advertisers are willing to pay to have their advertisement appear on the webpage being rendered. The advertising service then reviews all submitted bids and selects a winning bid.

Once the advertising service has selected advertisements for the webpage, the advertising service provides information back to the browser software that enables the browser software to obtain the selected advertisements. This information could be, for example, a URL at which an advertisement asset is stored. The browser software uses the information provided by the advertising service to obtain the selected advertisements, and the advertisements are then displayed at the appropriate locations on the webpage as part of the processes of rendering the webpage.

While the above-described process works well for display or banner ads, this process has various problems and difficulties when browser software is attempting to obtain a video advertisement that will be played to a user in conjunction with the play of video content.

As noted above, many publishers now place video content on their websites to induce users to navigate the website and view material. When a user requests the play of a video, it is possible to also play video advertisements to the user that the user must watch in order to view the desired video content. Video advertisements can be played to the user before the user is shown the desired video. In addition, and particularly in the case of a long video, the user may be forced to watch several short video advertisements at various different times as the full video content is played to the user. Because most video content on websites is relatively short in duration, video advertising is typically played immediately before the user is able to watch a desired video. Such advertisements are sometimes referred to as "pre-rolls."

When a webpage includes video content, one or more instantiations of a video player software application are generated as the webpage is rendered, and a particular video is loaded within each video player instantiation. The process of instantiating a video player on a webpage, and then loading a video within the video player can take a significant amount of time. Moreover, if multiple different video players, each with its own associated video, are to be rendered on a webpage, additional time is required to complete the rendering of the webpage by the browser.

It is possible to perform the same basic process described above for acquiring display or banner ads to instead acquire video advertisements. However, in the case of banner or display ads it is easy to send a request to an advertising service for display or banner ads immediately as the webpage begins to load. The general content of a webpage is known in advance, and that information can be provided to the advertising service, so the advertising service is able to select advertisements that are relevant to the content of the webpage.

In the case of video ads, however, is often difficult to know what type of video will be loaded into an instantiation of a video player software application. Often, only the title of the video is known, and the title of the video may not be indicative of the actual content of the video. As a result, it becomes more difficult for an advertising service to identify an appropriate video advertisement that will be played in advance of the video content.

Moreover, it is often necessary for the video player to be fully instantiated and for the correct video to be loaded before even the title of the video is known. This means there will be a significant time delay between when the browser software begins to render a webpage and the point in time at which the title of the video is known so that the video title can be passed along to the advertising service. In many instances, even the title of a video is unavailable when the advertising service must select a video advertisement that will be played with a particular video. Advertisers are unwilling to pay as much to place a video advertisement when the relevance of the advertisement is in doubt as compared to a situation where the advertiser knows that the advertisement is relevant to the video that will be played by the user.

In addition, it is often difficult for the browser to determine where on the webpage the video player will be located once the webpage is fully rendered. The browser often also does not know the size of the player, the resolution of the video that will be played, the language of the video that will be played and various other items of information that an advertiser would like to know in order to select an appropriate video ad. Here again, this uncertainty means that advertisers are not willing to pay as much to have a video advertisement played than they would in situations where these items of information are known.

For all the above-described reasons, and for additional reasons discussed below, it is difficult to use the traditional display advertising acquisition methods to select appropriate video ads to be played in connection with videos which appear on a website. Moreover, essentially the same problems exist in connection with selecting appropriate video ads to be played in connection with the play of videos on mobile devices and televisions connected to the Internet.

DETAILED DESCRIPTION

The invention is primarily embodied in video player software applications that would be instantiated during rendering of a webpage. However, aspects of the invention can also be found in other software applications, and also within a partner advertising provider.

Figure 1:
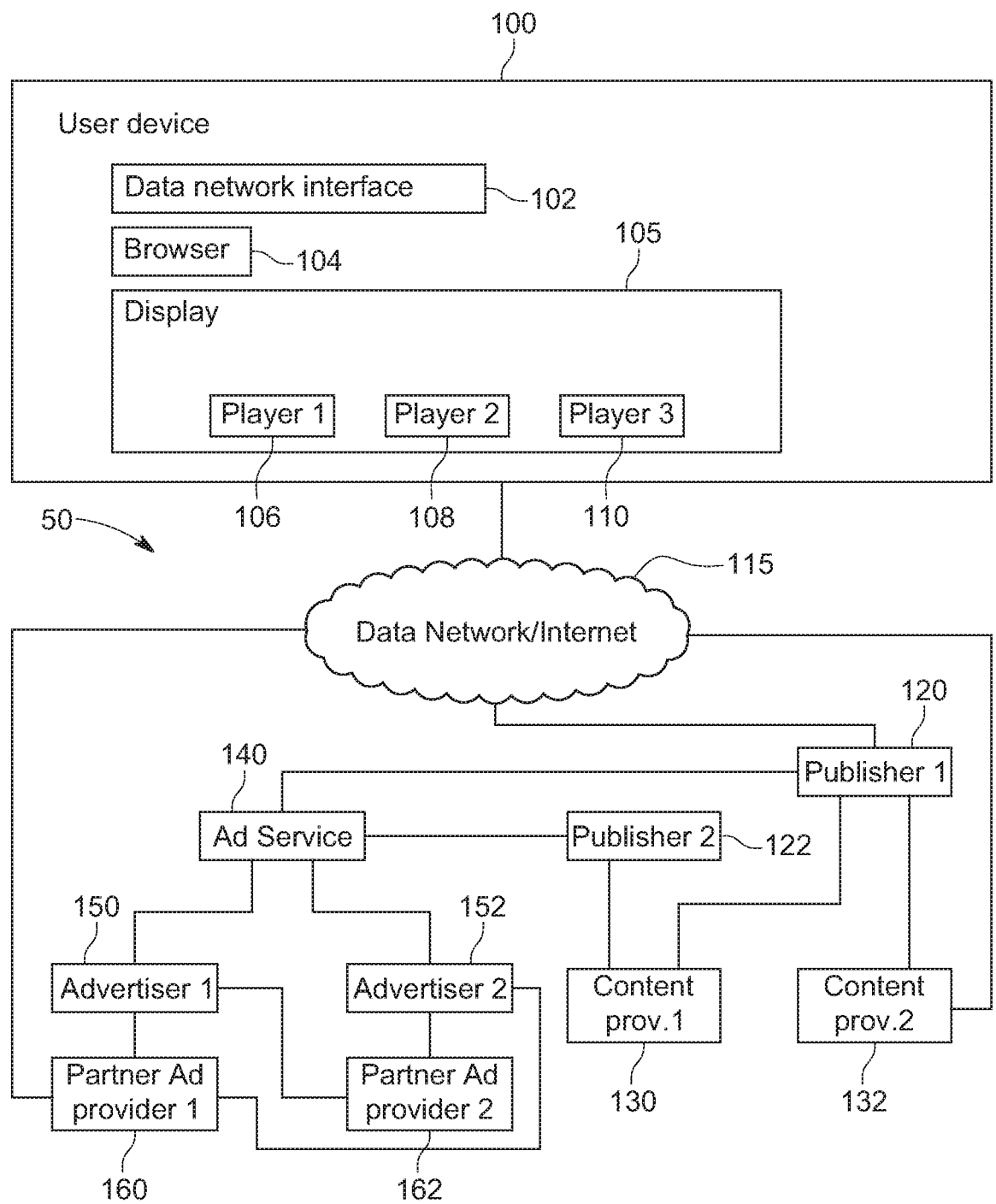
FIG. 1 is a diagram illustrating a communications environment in which systems and methods embodying the invention can be performed.

FIG. 1 illustrates a communications environment 50 in which a video player software application embodying the invention could be used. As shown in FIG. 1, a user computing device 100 includes a data network interface 102 for communicating with a data network such as the Internet 115. A browser software application 104 is resident on the user's computing device 100. The browser software application 104 renders webpages on a display 105 of the user computing device 100.

As also shown in FIG. 1, the browser software application 104 could render a webpage on the display 105 that includes three separate instantiations of a video player software application 106/108/110. Each individual instantiation of the video player software application would be loaded with a different video.

The communications environment 50 also includes a first website publisher 120 and a second website publisher 122. The first and second website publishers 120/122 provide webpages to user's browser software application 104 via the Internet 115. The first and second website publishers 120/122 obtain video content from content provider 130 and content provider 132, as well as from other sources. A website publisher also could create its own video content, in addition to acquiring video content from other sources.

As explained above, the first and second website publishers 120/122 can engage in contractual relationships with an advertising service 140 to obtain advertisements which will be displayed on the publishers' websites. The advertising service 140, in turn, obtains advertisements from a first advertiser 150 and a second advertiser 152. Those of ordinary skill in the art will appreciate that there would in fact be a very large number of advertisers that provide advertisements to an advertising service 140. Moreover, there can be multiple advertising services, each of which contracts with multiple advertisers and multiple website publishers. Thus, the depiction provided in FIG. 1 should in no way be considered limiting. The process by which the advertising service 140 provides advertisements so that the advertisements can be displayed or played on a publisher's website will be described in greater detail below in connection with FIG. 5.

The communications environment 50 illustrated in FIG. 1 also includes a first partner advertising provider 160 and a second partner advertising provider 162. As will be explained in detail below, a partner advertising provider can provide video advertisements for play on a publisher's website in a more efficient and faster way than would be done via traditional methods that utilize an advertising service 140.

Figure 2:
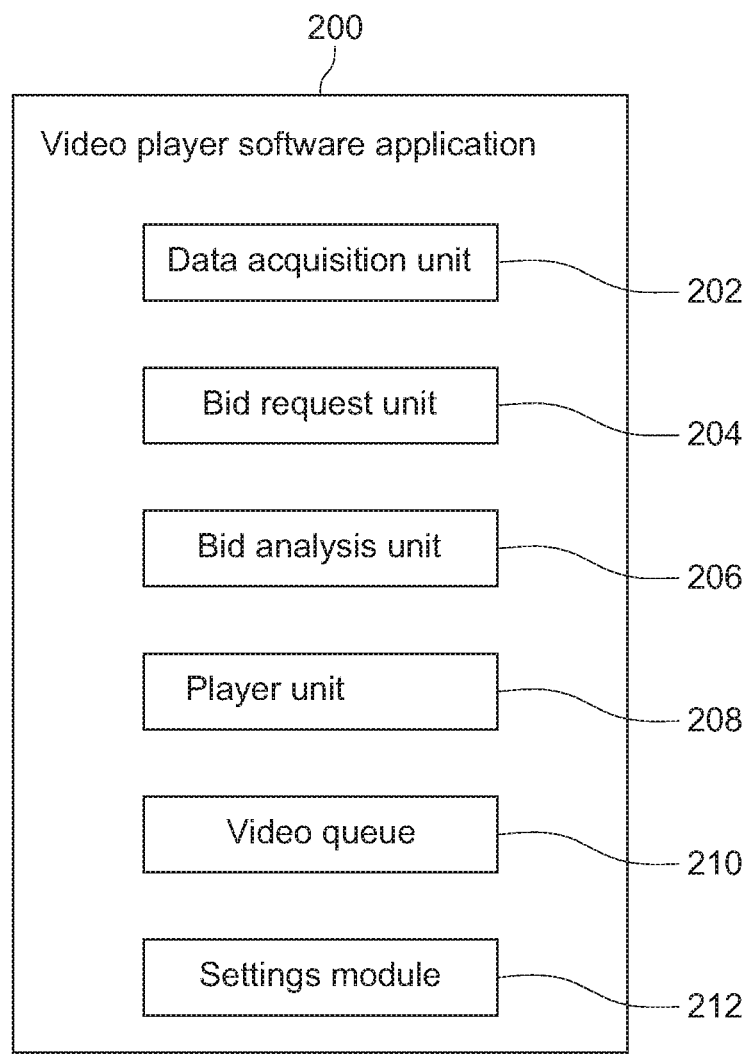
FIG. 2 is a diagram of various elements of a video player software application.

FIG. 2 illustrates selected elements of a video player software application 200. As noted above, when a browser renders a webpage, the browser could instantiate multiple instances of the video player software application 200 on the webpage, and each instantiation of the video player software application 200 could be loaded with a different video.

The video player software application 200 includes a data acquisition unit 202 that obtains various items of information about the particular instantiation of the video player software application 200. Those items of information could include the title of a video that has been loaded, as well as various items of information about the content of the video. The data acquisition unit 202 might also obtain information about the appearance of the video player on the webpage, such as a size of the video player within the webpage and its location on the webpage. Information about the location of the video player software application on a webpage can include whether the player is currently within a viewable part of the webpage on the display shown to the user. In some instances, a webpage will be large and it will be necessary for a user to take a positive action to navigate to another viewable portion of the webpage in order for the video player to become visible to the user.

The data acquisition unit 202 might also obtain various items of information about settings of the video player software application 200, such as the resolution of a loaded video, a volume setting, a language setting, as well as various other similar settings.

The video player software application 200 also includes a bid request unit 204, and a bid analysis unit 206. The bid request unit 204 and the bid analysis unit 206 are used to obtain bids for playing video advertisements from a partner advertising provider, or from a traditional advertising service, as will be explained in greater detail below. Essentially, the bid request unit 204 will send a request for a bid for playing a video advertisement to one or more partner advertising providers, or to an advertising service. The bid analysis unit 206 receives bids from one or more partner advertising providers or from an advertising service, and it decides whether to accept one of the bids. If the bid analysis unit 206 decides to accept a bid from a partner advertising provider, the player unit 208 of the video player software application will then play a video advertisement provided or identified by the winning partner advertising provider.

The video player software application 200 can also include a video queue 210, which is a list of videos that will be played after the currently loaded video. In addition, a settings module 212 can hold the current settings of the instantiation of the video player, such as volume, resolution, language, and various other settings.

The depiction of a video player software application 200 provided in FIG. 2 should in no way be considered limiting. A particular instantiation of a video player software application 200 could include many other elements in addition to those shown in FIG. 2. Conversely, a particular instantiation of a video player software application 200 may not include all the elements illustrated in FIG. 2.

Figure 3:
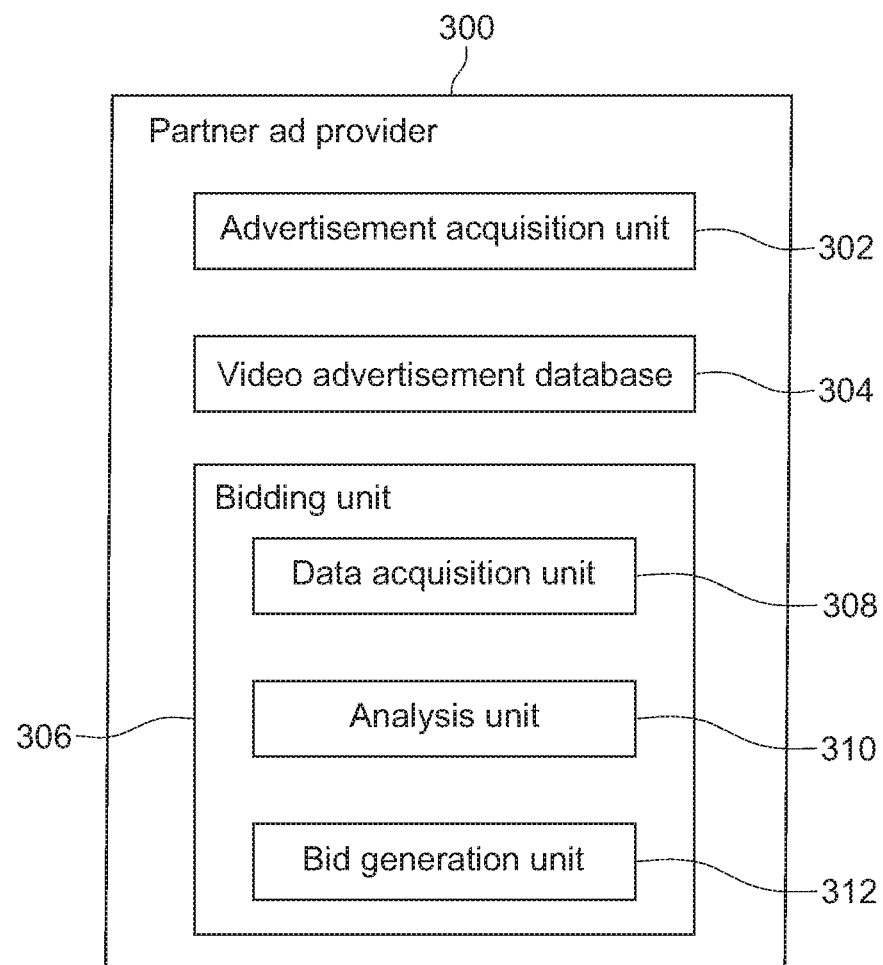
FIG. 3 is a diagram of various elements of a partner and provider.

FIG. 3 illustrates various elements of a partner advertising provider 300. As will be explained in greater detail below, a partner advertising provider 300 can work in concert with a video player software application 200 embodying the invention to quickly obtain video advertisements relevant to a video loaded into the video player software application 200.

The partner advertising provider 300 includes an advertising acquisition unit 302 that obtains various video advertisements from various advertising parties. Information about available video advertisements can be stored in a video advertisement database 304. In some instances, the video advertisements themselves could be stored as part of the video advertisement database 304. In other instances, the video advertisement database may comprise the titles of advertisements, information about the advertisements, and information about how the advertisements can be obtained, such as URL information.

The partner advertising provider 300 also includes a bidding unit 306. The bidding unit 306 responds to bid requests issued by bid request unit 204 of the video player software application 200, as described in greater detail below.

The bidding unit 306 includes a data acquisition unit 308 that is responsible for acquiring various information that can be used to generate a bid that will be sent back to the video player software application 200. The information could relate to the publisher's website, and also to the instantiation of a video player software application that is making a bid request. The more information that the bidding unit 306 has regarding the webpage, the website publisher and the instantiation of the video player software application, the better chance that the bid generated by the bidding unit 306 will be accepted, and the video advertisement will therefore be played. The data acquisition unit 308 might also be capable of obtaining various items of information needed to create a winning bid based upon the information which is included in the bid request received from a video player software application 200, as will be explained in greater detail below.

The bidding unit 306 also includes an analysis unit 310 that analyzes information included in a bid request, as well as information that is obtained by the data acquisition unit 308, in order to generate a bid that is sent back to a video player software application. In addition, the bidding unit 306 includes a bid generation unit 312 that generates the actual bid that is sent back to a video player software application. Typically, the bid will include a price that the partner advertising provider is willing to pay to have a certain video advertisement played to the webpage viewer. The bid may also include information that will enable the video player software application to obtain and play the video advertisement selected by the partner advertising provider 300.

Figure 4:
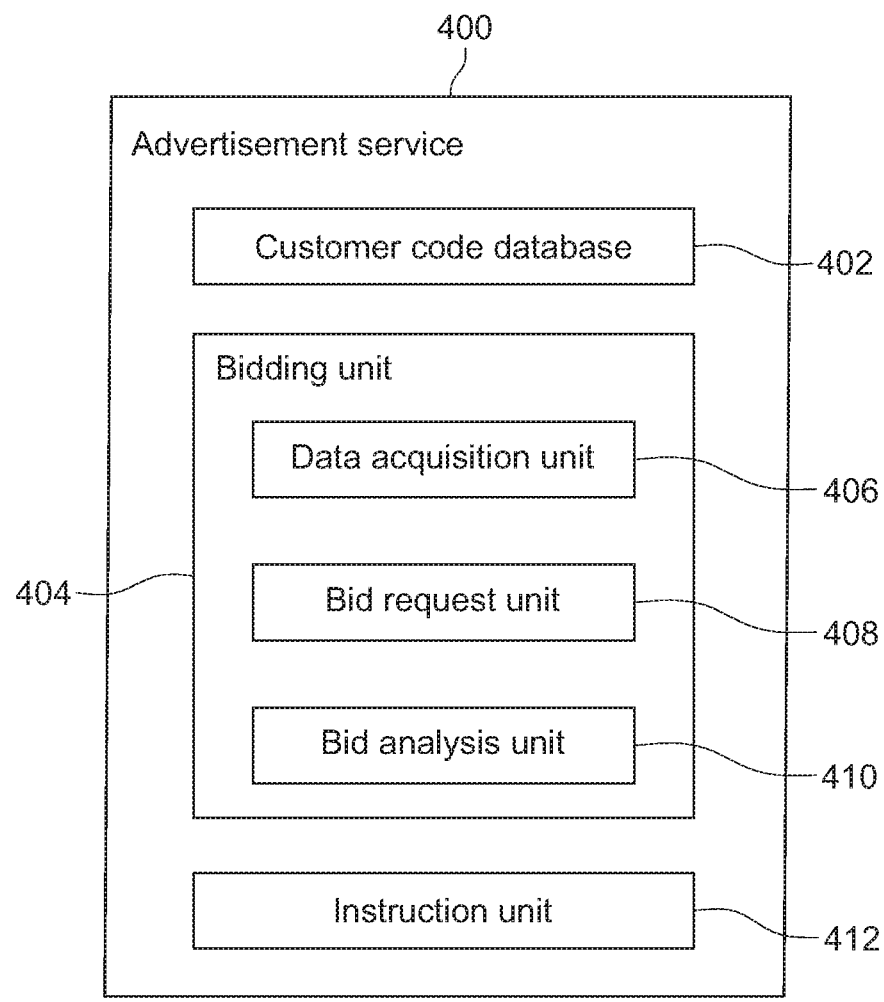
FIG. 4 is a diagram of various elements of an advertising service.

FIG. 4 illustrates various elements of a more traditional advertising service 400 that a website publisher can utilize to obtain advertisements that are displayed on the website publisher's website. The advertising service 400 could offer display or banner ads, as well as video advertisements to a website publisher.

The advertising service 400 includes a customer code database 402, which can include individual items of computer code that have been custom created for each of the advertising service's clients. The computer code created for a particular website publisher is sometimes referred to as an "ad tag". The custom code created for each website publisher could take into consideration various factors including the type of content that the website publisher typically places on its websites.

The advertising service 400 also includes a bidding unit 404. In the case of an advertising service 400, the bidding unit 404 sends bid requests out to various advertisers to request their bids for placing an advertisement on a website publisher's website. Thus, the bidding unit 404 is not providing a bid back to the video player software application, as would a partner advertising provider 300. Instead, the bidding unit 404 is sending bid requests to advertisers, and then receiving and evaluating the advertiser's bids.

The bidding unit 404 includes a data acquisition unit 406 that is responsible for obtaining various items of information that are needed to send bid requests to advertisers, and also to evaluate bids provided by those advertisers. The bidding unit 404 also includes a bid request unit 408 that sends bid requests out to various advertisers, as will be described in greater detail below. Finally, the bidding unit 404 includes a bid analysis unit 410 that analyzes bids provided by advertisers to determine which advertiser's bid to accept.

The advertising service 400 further includes an instruction unit 412, which sends information back to either a web browser that is rendering a webpage, or to a video player software application instantiated on a webpage. The information enables the browser or video player to obtain and display/play the advertisement selected by the bid analysis unit 410

Figure 5:
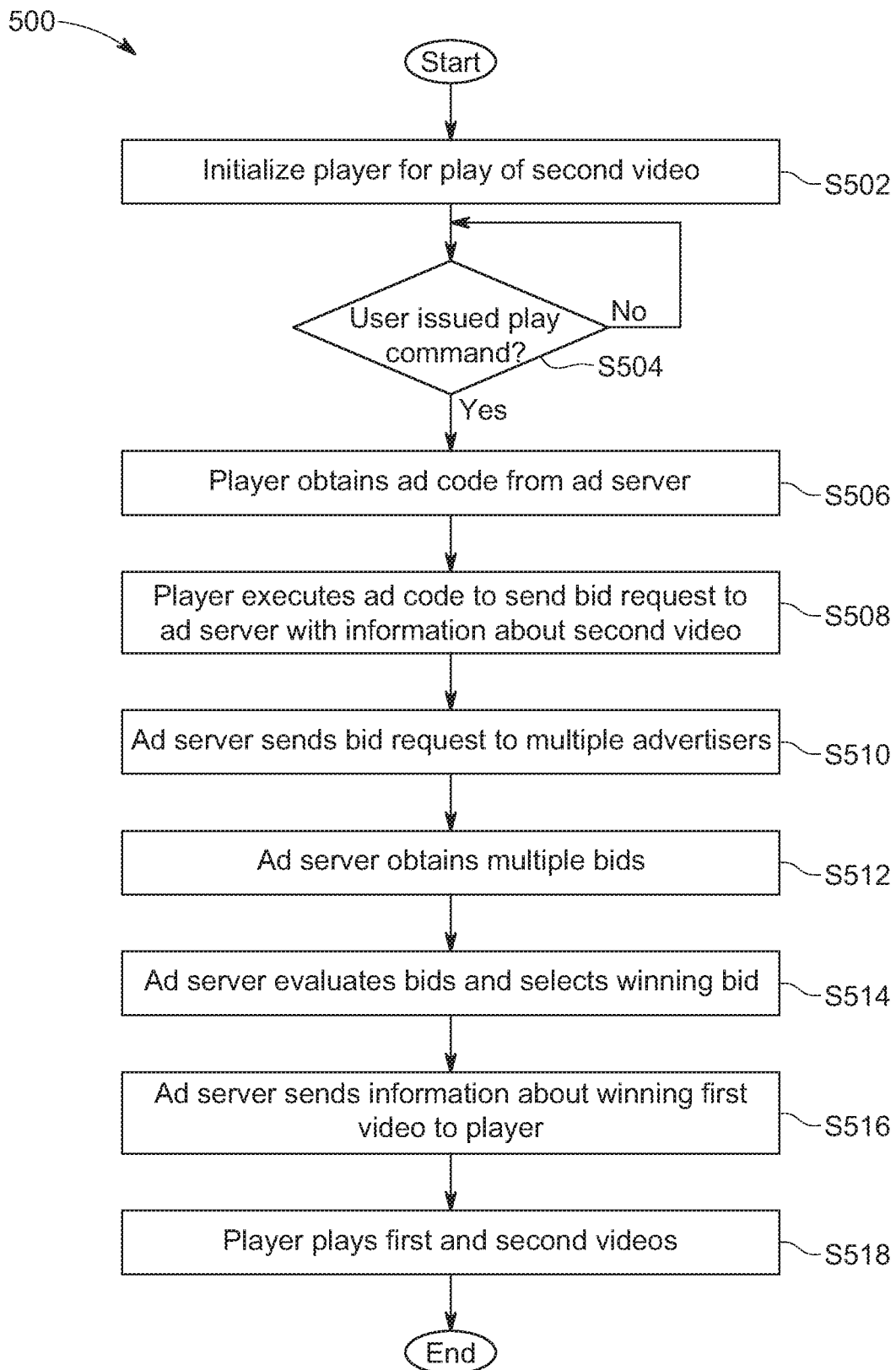
FIG. 5 is a flowchart illustrating steps of a known method for obtaining and playing video content.

FIG. 5 illustrates various steps of a method 500 that would be performed to cause an instantiation of a video player software application on a webpage to play a video advertisement in conjunction with actual video content. For purposes of the following description, we will refer to a first video and a second video. In this context, the second video is the video content loaded into a video player software application that a user actually wishes to see. The first video would be a video advertisement that will be played to the user before the second video begins to play.

In a typical example, when a webpage is rendered by a browser 104 on a user's computer device 100, a video player software application 200 is instantiated and rendered along with the other elements of the webpage. A particular video is typically loaded in the instantiation of the video player software application 200. The video loaded in the video player software application 200 may have been selected by the publisher of the website because the publisher believes that users would like to view the video. Alternatively, the website publisher may rely upon recommendations from a third party to decide which video to load in the video player software instantiation. Often, a still image relating to the video is displayed within the video player on the webpage, and the still image could include a title or some descriptive material indicating what the video will include.

The method 500 illustrated in FIG. 5 starts and proceeds to step S502 where the video player software application 200 is initialized. Initialization of the video player can include loading a video such that a still image relating to the video is displayed within the video player software application on the webpage. In addition, various initial settings for the video player software application may also be established at this time. After initialization has been completed, the video will be ready to play. However, in most web browsers autoplay of videos is prevented. Instead, a user must take some positive action to cause the video to begin playing. The positive action can include, for example, clicking on a play button within the video player software application on the webpage.

Note, according to the first video/second video naming convention explained above, the video player is first configured to play the "second video," which is the video content the user originally intended to see. When the video player is first instantiated, the video player does not know what video advertisement, the "first video," will be played in conjunction with the second video.

After initialization has been performed in step S502, a check is made in step S504 to determine if the user has yet issued a play command. If not, the process loops back and step S504 is repeatedly performed until the player issues a play command. Once the player has issued the play command, the method proceeds to step S506 where the video player software application begins the process of obtaining a video advertisement which will be played to the user before the second video.

To obtain the first video from an advertising service 400, the video player software application 200 sends a request to the advertising service 400 seeking the website publisher's "ad tag" from the customer code database 402 of the advertising service 400. As noted above, the ad tag is a piece of custom computer software code that can be executed by the video player software application to help obtain video advertisements from the advertising service 400. The advertising service 400 will look up the correct ad tag for the website publisher, and return it to the video player software application 200.

In step S508, the video player software application 200 executes the ad tag computer code obtained from the advertising service 400 and generates a bid request which is then sent to the bidding unit 404 of the advertising service 400. The bid request can include information about the second video, which is loaded in the video player software application 200, as well as other items of information about the video player software application 200, such as its placement on the webpage, its size, the resolution of the second video, and perhaps other information about the webpage.

In step S510 a bid request unit 408 of the bidding unit 404 of the advertising service 400 utilizes information received from the video player software application 200 to create a bid request that is then sent to multiple advertisers. The bid request invites advertisers to bid on the placement of a video advertisement on the webpage.

In step S512, the bidding analysis unit 410 of the advertising service 400 receives multiple bids from various advertisers. Each bid will include a price that an advertiser is willing to pay to place a video advertisement on the webpage, as well as information identifying the advertisement. The bids returned by the advertisers can also include information about the video advertisement that they propose to have played on the webpage. Each bid also can include information which can later be used by the video player software application to obtain and play the advertiser's video advertisement. For example, each bid can include a URL at which the video advertisement can be obtained.

In step S514, the bid analysis unit 410 evaluates the various bids provided by the advertisers and selects one of them as the winning bid. In step S516 the instruction unit 412 of the advertising service 400, then instructs the video player software application 200 as to which video advertisement to play as the first video, before the second video is played. Here again, a URL at which the video advertisement can be obtained could be the information provided by the instruction unit 412 back to the video player software application 200.

Finally, in step S518, the player unit 208 of the video player software application 200 plays the video advertisement as a first video, and thereafter plays the second video which the user asked to see. The method then ends.

The process described above in connection with FIG. 5 is a typical way that a video advertisement is selected and then played to a user. It requires that multiple individual communications occur and that various bids provided by advertisers be analyzed in order to select a winning bid. Note, all the activity that occurs in order to select a video advertisement occurs only after the user has issued a play command, such as selecting the play button on the displayed video player software application 200. Because all these actions occur after the player has issued a play command, there can be a significant time delay between when the user pushes the play command, and when the first video (the video advertisement) begins to play. If this delay becomes pronounced, it leads to user dissatisfaction. Indeed, if the delay becomes too long, often a user will give up and switch to a different video.

Another aspect of this process is that the advertising service 400 is ultimately selecting the video advertisement that will be played. The video player software application itself simply asks the advertising service 400 to provide a video advertisement, and then plays whatever video advertisement is specified by the advertising service 400. As a result, the publisher of the website is unable to exert much control as to the advertisement that will be played or the price that will be paid for play of the video advertisement. Systems and methods embodying the invention are designed to correct or alleviate these and other problems with the typical process for selecting a video advertisement.

Figure 6:
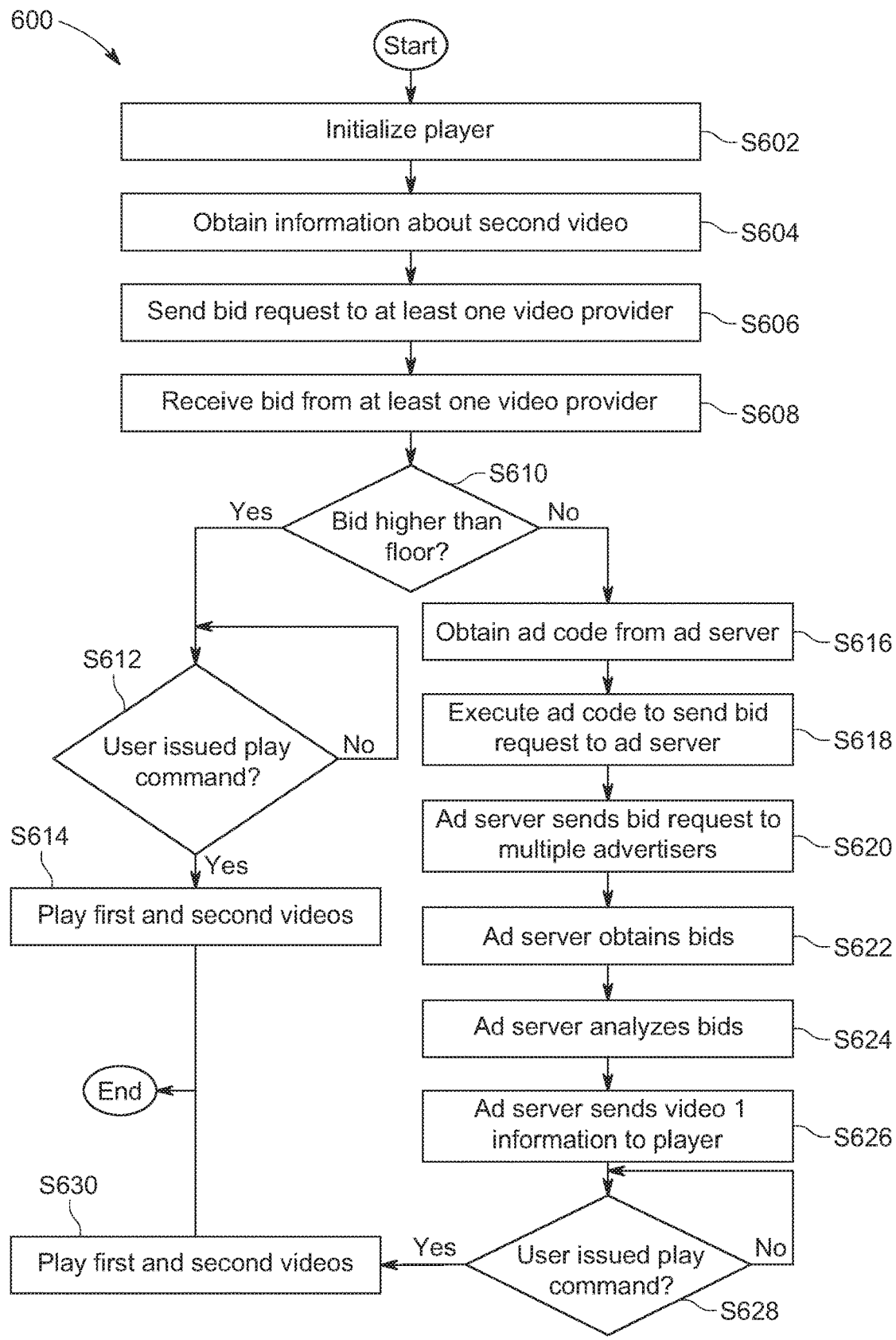
FIG. 6 is a flow diagram illustrating steps of a first method embodying the invention.

FIG. 6 illustrates steps of a method embodying the invention that can be used to more quickly obtain and play a relevant first video advertisement. The method 600 starts and proceeds to step S602 where the video player software application 200 is initialized as it is instantiated onto a webpage by a browser on a user's computer. The initialization procedure performed at step S602 would include loading a second video that will be played to a user if a user issues a play command.

In step S604, a data acquisition unit 202 of the video player software application initialized in step S602 acquires information about the second video that has been loaded for play. This likely will include the title of the video, and possibly information describing the content of the video, as well as information about settings on the video player itself. This information could also include details about where the instantiation of the video player software application appears on the webpage. For example, whether the video player software application is on a viewable portion of the webpage. The settings information also may include information about the size of the player, volume settings, language settings, and other information.

In step S606 a bid request unit 204 of the video player software application sends a bid request to one or more partner advertising providers 300, as illustrated in FIG. 3. The bid request will include information that the data acquisition unit 202 was able to acquire, and which could be used by the partner advertising providers 300 to select a first video advertisement for play within the instantiation of the video player software application 200.

At this point, one or more partner advertising providers would receive a bid request from the bid request unit 204 of the video player software application. The partner advertising provider(s) would then select a video advertisement, and decide on a bid amount—which is the price the partner advertising provider is willing to pay to have the selected video advertisement played in conjunction with the second video loaded in the video player software application 200. The partner advertising provider(s) then sends a bid to the bid analysis unit 206 of the video player software application 200. The bid can include information that will enable the video player software application to obtain and play the video advertisement selected by the partner advertising provider, such as a URL at which the video advertisement is stored. Note: none of these actions are illustrated within FIG. 6, but these actions would be performed by one or more partner advertising providers as part of this overall method.

In step S608, the bid analysis unit 206 of the video player software application 200 receives at least one bid for playing a first video advertisement from a bid generation unit 312 of a partner advertising provider 300. If multiple partner advertising providers respond to the bid request sent by the bid request unit 204, the bid analysis unit 206 will receive multiple bids. Each received bid will include the price that a partner advertising provider is willing to pay to have a first video advertisement played to the user. In addition, as noted above, the bid will typically also include information that will enable the video player software application to obtain and play a first video advertisement.

If the bid request unit 204 receives multiple bids from multiple partner advertising providers, the bid analysis unit 206 may select the bid offering the highest price for further analysis. In other instances, other considerations besides or in addition to the bid price may come into play in determining which bid to subject to further analysis. Regardless, at the conclusion of step S608 a single bid from one partner advertising provider is selected for further analysis.

The method then proceeds to step S610 where the bid analysis unit 206 compares the price of the selected (or only) bid to a preset floor price. The preset floor price can be set by the website publisher by configuring the settings of the video player software application 200 in the settings module 212. The preset floor price is the minimum price that the website publisher will accept in order to play a first video advertisement to a user.

If the analysis performed in step S610 indicates that the bid from the partner advertising provider was equal to or higher than the preset floor price, the method proceeds to step S612 where a check is performed to determine if the user has issued a play command. If not, step S612 is repeatedly performed until it is determined that the user has issued a play command. When that occurs, the method proceeds to step S614, where the player unit 208 of the video player software application 200 plays the first video advertisement identified in the winning (or only) bid from a partner advertising provider, and thereafter plays the second video, which was originally loaded into the video player software application during the initialization step at S602. The method then ends.

If the analysis performed in step S610 indicates that the bid price provided by a partner advertising provider is lower than the preset floor price, then the traditional procedures for obtaining and playing a first video advertisement are performed, similar to what was described in connection with FIG. 5.

The method would first proceed to step S616 where the video player software application requests and obtains an ad tag from an advertising service 400. The method would then proceed to step S618 where the custom code in the ad tag is executed by the video player software application 200 to create a bid request that is then sent to the bidding unit 404 of the advertising service 400.

In step S620, the bidding unit 404 of the advertising service 400 sends bid requests to multiple advertisers. In step S622 the advertising service 400 receives bids from multiple advertisers. In step S624, the bid analysis unit 414 of the advertising service analyzes the received bids and selects a winning bid. In step S626 the instruction 412 of the advertising service 400 sends information to the video player software application 200 indicating which first advertisement video should be played to the user.

The method then proceeds to S628, where a check is performed to determine if the user has issued a play command. If not, step S628 is repeatedly performed until it is determined that the user has issued a play command, in which case the method proceeds to step S630 and the video player software application 200 plays the first video advertisement and then the second video that was originally loaded into the video player software application during the initialization step S602. The method then ends.

A method as explained above in connection with FIG. 6 has multiple advantages over a traditional method for obtaining a video advertisement, such as the one illustrated in FIG. 5. First, if a partner advertising provider 300 provides a bid price which is equal to or higher than the preset floor price established by the website publisher, the bid received from the partner advertising provider will already include the information needed by a video player software application 200 to obtain and play the first video advertisement. As a result, the video player software application can much more rapidly obtain the first video advertisement than would be possible with the far more detailed procedures that must be followed to obtain a first video advertisement from a typical advertising service 400. As a result, it is unlikely that there would be any significant delay between the time that a user issues a play command and the time that play of the first video advertisement begins. The elimination of any delay before the video begins to play is very helpful in keeping the user's attention.

In addition, regardless of whether the video advertisement is obtained from a partner advertising provider or from a traditional advertising service, the information needed to obtain and play the first video advertisement will be acquired in many cases before the user issues a play command. Note, in the method illustrated in FIG. 5, which is a traditional method for obtaining a first video advertisement, the method does not begin until the user issues the play command. In contrast, with the method as illustrated in FIG. 6, regardless of how the first video advertisement is obtained, the steps needed to obtain the first video advertisement are performed immediately after initialization of the video player software application, without the need for the user to first issue a play command.

In addition, when partner advertising providers are involved, they know that they are bidding not just against other partner advertising providers, but also against the floor price that is established by the website publisher. This can result in the partner advertising providers making a larger bid than they otherwise would when competing only against other partner advertising providers. Thus, website publishers may increase their advertising revenue.

Moreover, a method as illustrated in FIG. 6 may enable the website publisher to exert greater control over the entire process than in a method as illustrated in FIG. 5, which utilizes a traditional advertising service 400. Often the website publisher has an exclusive arrangement with only a single advertising service, and it is the advertising service that decides which bids to accept from advertisers. In a method as illustrated in FIG. 6, it is the website publisher that establishes the floor price they will accept from a partner advertising provider. It is only when no bid from a partner advertising provider exceeds the floor price established by the website publisher that the website publisher resorts to the services of a typical advertising service 400.

Figure 7:
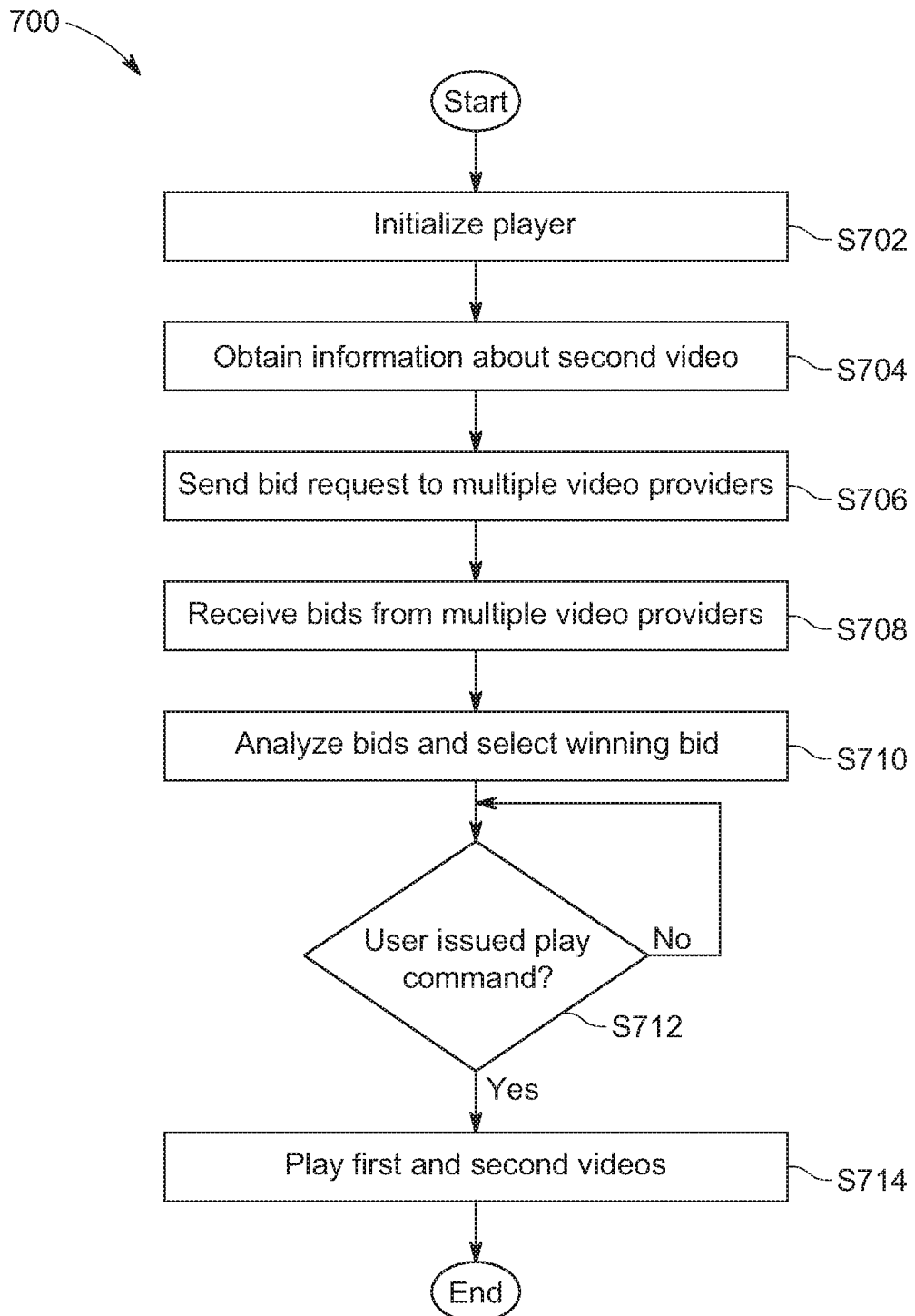
FIG. 7 is a flowchart illustrating steps of a second method embodying the invention.

FIG. 7 illustrates a second method embodying the invention. In this alternate method, we assume that a bid request will be sent to multiple partner advertising providers, and that multiple bids are then received. In this method, the bids sent by the partner advertising providers are not compared to a preset floor price. Instead, the bids are compared to one another and a winning bid is determined based on one or more factors.

The method 700 begins and proceeds to step S702 where the video player software application is initialized as it is instantiated on a webpage. A second video would then be loaded into the video player software application.

The method proceeds to step S704 where a data acquisition unit 202 of the video player software application 200 obtains information about the second video, and perhaps information about the video player software application 200 and its settings. The method then proceeds to step S706 where a bid request unit 204 sends a bid request to multiple partner advertising providers 300.

A bidding unit 306 in each of the partner advertising providers 300 then creates a bid, and the bids from each of the partner advertising providers 300 are sent back to a bid analysis unit 206 of the video player software application 200. Step S708 involves receiving bids from the multiple partner advertising providers, where each bid includes a price that the partner advertising provider is willing to pay for play of a video advertisement, as well as information that would enable the video player software application 200 to obtain and play a specified video advertisement. The bid may also include information about the video advertisement that the partner advertising provider proposes to play.

In step S710 the bid analysis unit 206 of the video player software application 200 analyzes the bids and selects a winning bid. In some instances the highest received bid is selected as the winning bid. In other instances, various other considerations may come into play when selecting a bid as the winning bid.

For example, contractual obligations between the website publisher and one or more of the partner advertising providers may play a role in which bid is selected as the winning bid. For example, a website publisher might guarantee that they will accept a minimum number of bids from a particular partner advertising provider over a certain period of time. In that instance, the bid analysis unit 206 might select a bid from that partner advertising provider as the winning bid, even if the bid does not carry the highest price, so that the website publisher can satisfy its contractual obligation to the partner advertising provider.

In other instances, the bid analysis unit may take into account the nature and/or content of the video advertisements that are identified in received bids when selecting one of the bids as the winning bid. For example, the bid carrying the highest price may be rejected in favor of a lower priced bid if the website publisher does not approve of the product being advertised in the advertisement identified in the higher priced bid. Various other factors that relate the nature and content of the advertisements may also come into play when selecting one of the bids as the winning bid.

Once the winning bid has been selected, the method proceeds to step S712 where a check is performed to determine if the user has issued a play command. If not, step S712 is repeatedly performed until the user has issued a play command, in which case the method proceeds to step S714. In step S714 the player unit 208 of the video player software application 200 plays the first video advertisement associated with the winning bid, and then plays the second video, which was initially loaded into the video player software application during the initialization step S702. The method then ends.

Figure 8:
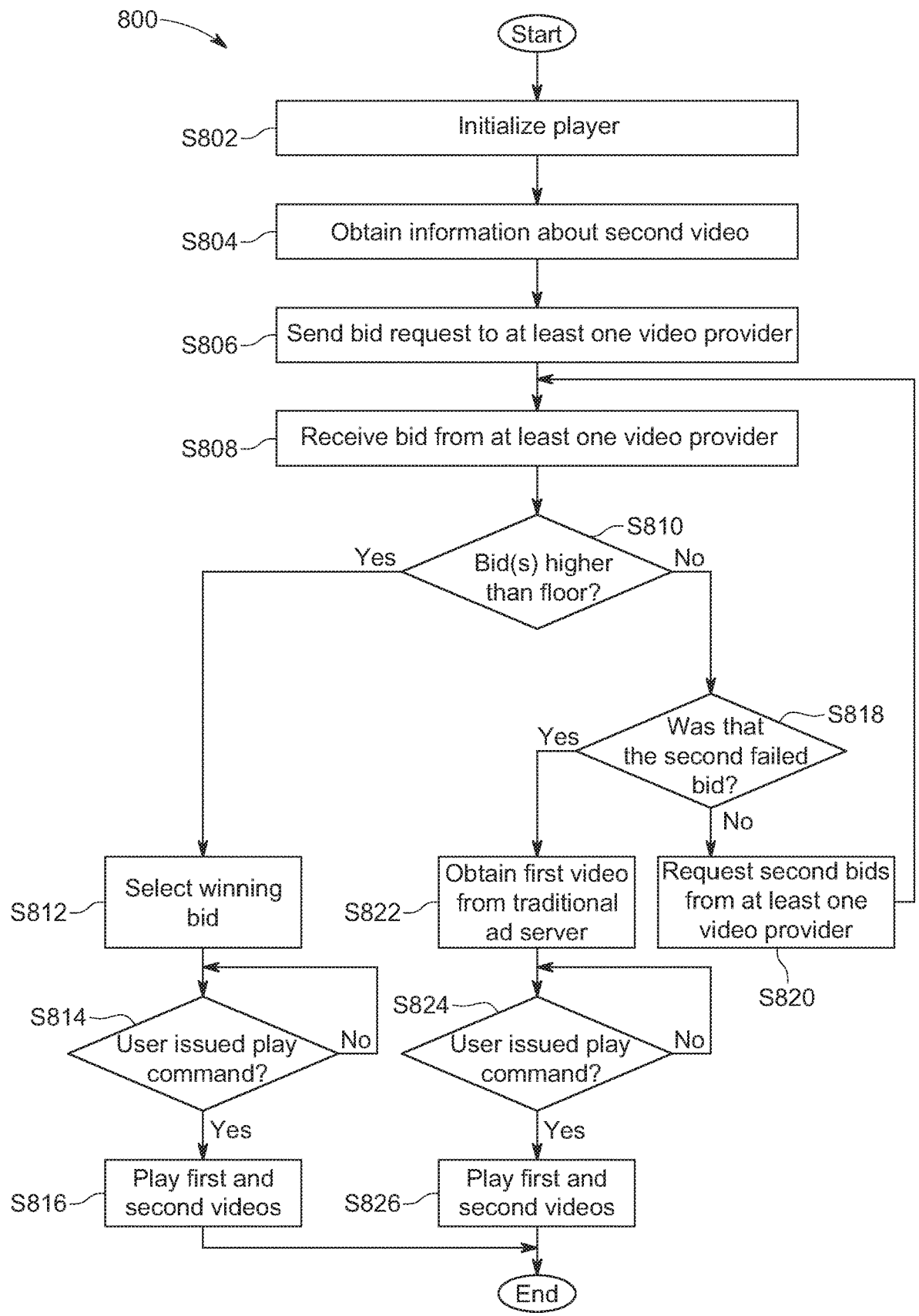
FIG. 8 is a flowchart illustrating steps of a third method embodying the invention.

FIG. 8 illustrates steps of another method embodying the invention. In this method, bid requests are sent to partner advertising providers, and the bids that they return are compared to a preset price floor. If none of the bids submitted by the partner advertising providers is determined to be equal to or greater than the present price floor, the partner advertising providers are given a second chance to submit higher bids.

The method 800 begins and proceeds to step S802 where a video player software application 200 is initialized as a webpage is rendered by a browser. In step S804, a data acquisition unit 202 the video player software application 200 obtains information which can be passed on to the partner advertising providers who will bid for playing a video advertisement. In step S806, the bid request unit 204 of the video player software application 200 sends bid requests to multiple partner advertising providers. The partner advertising providers then generate and send bids back to the bid analysis unit 206 of the video player software application 200. Those bids are received by the bid analysis unit 206 in step S808.

In step S810, the prices within the bids submitted by the partner advertising providers are compared to a preset price floor set by the website publisher. If one or more of the bids is above the preset price floor, the method proceeds to step S812, and one of the bids is selected as the winning bid. The method then proceeds to step S814 where a check is performed to determine if the user has issued a play command. This step repeats until the check performed in step S814 indicates the user has issued a play command. The method then proceeds to step S816 where the first video advertisement associated with the winning bid is played by the player unit 808 of the video player software application 200, and then the second video loaded into the video player software application 200 during initialization step is played to the user. The method then ends.

If the analysis performed in step S810 indicates that none of the bids were above the preset price floor, the method proceeds to step S818. In step S818, a check is performed to determine if the failed bid was a second failed bid attempt by the video advertising providers. If not, indicating that this was the first failed bid attempt, the method proceeds to step S820 where a second bid request is sent to the partner advertising providers. The second bid request is marked in some way to indicate this is that this is a repeat bid request because a first set of bids associated with a first bid request all failed to rise above the preset price floor set by the website publisher. The method then proceeds again through steps S808 and S810.

During the second performance of step S810, a check is performed to determine if one of the second bids provided by the partner advertising providers is equal to or greater than the preset price floor. If so, the method proceeds on to steps S812, S814 and S816, as explained above. The method then ends after play of the second video.

If the second performance of step S810 indicates that the second bids also were all below the preset price floor, the method again proceeds to step S818. During the second performance of step S818 it will be determined that this was the second failed bid attempt, which will result in the method proceeding to step S822. In step S822, the traditional method of obtaining a first video advertisement from an advertising service, as described in connection with FIG. 5, is performed to obtain the identification of a first video advertisement that will be played. The method then proceeds to step S822, where a check is performed to determine if the user has issued a play command. Step S822 is repeatedly performed until the user has issued a play command. The method then proceeds to step S824, with a first video advertisement and the second video being played to the user. The method then ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
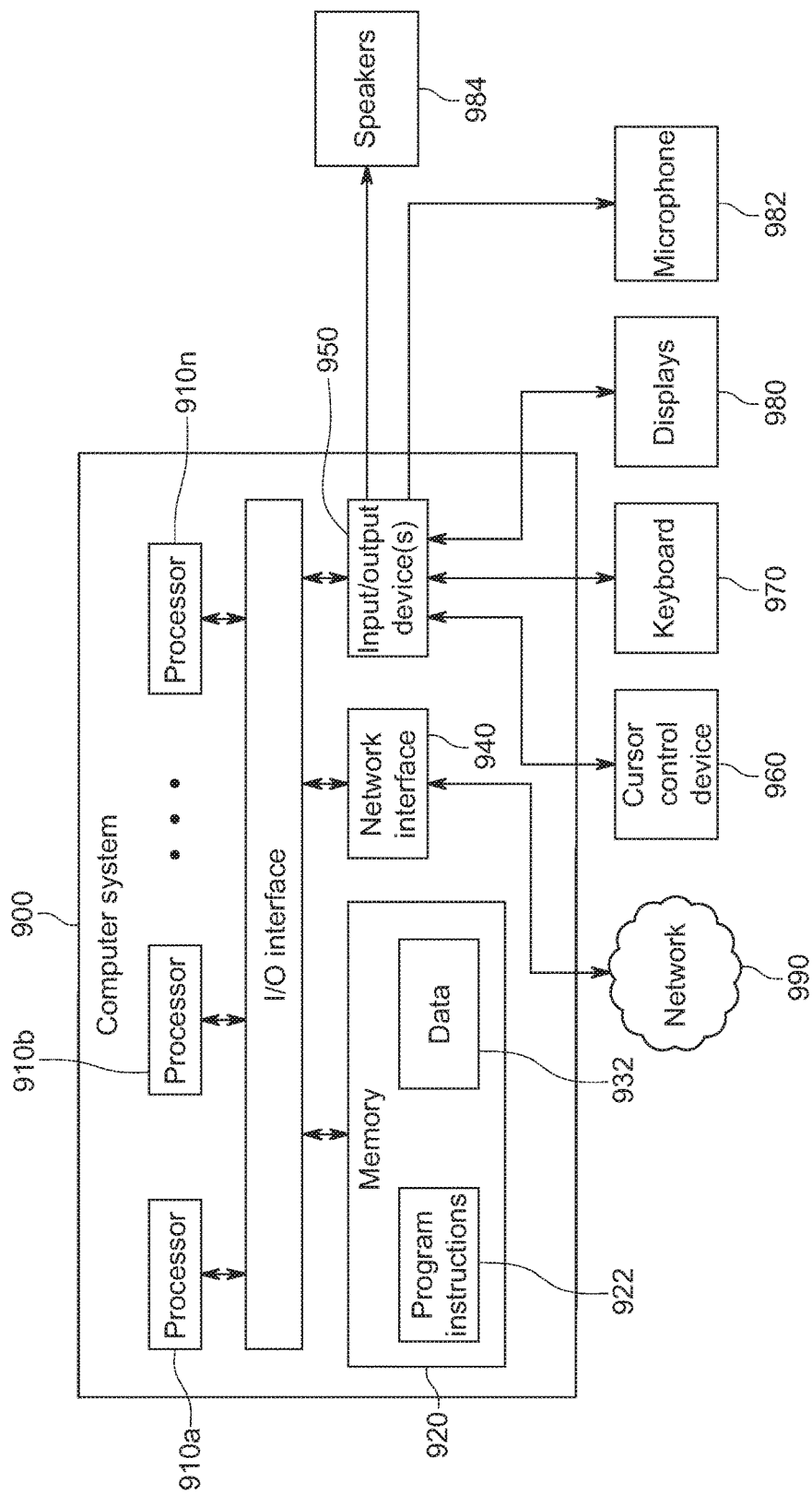
FIG. 9 is a diagram illustrating elements of a computer system and associated peripherals which could embody various aspects of the invention.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, and one or more input/output devices 950, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 5-8. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a video player software application for obtaining and playing a first video in connection with the play of a second video, comprising:
    performing initialization procedures when the video player software application is instantiated as part of a process of rendering a page of a website on a user's browser, wherein the initialization procedures include identifying at least a title of a second video that will be played by the video player software upon receiving a play command from the user;
    sending a bid request to at least one video provider, where the bid request includes information about the second video and information about the instantiation of the video player software application on the rendered page of the website;
    receiving from at least one video provider, a bid for playing a first video to the user, where the bid includes a price that the at least one video provider will pay to have the first video played to the user, and information that enables the video player software application to obtain and play the first video to the user;
    comparing the bid price received from the at least one video provider to a preset floor value; and
    playing the first video to the user when the user issues a play command and when the bid price received from the at least one video provider is equal to or greater than the preset floor price, and thereafter playing the second video to the user.

2. The method of claim 1, wherein the bid request includes a title of the second video.

3. The method of claim 1, wherein the bid request includes information describing or characterizing the content of the second video.

4. The method of claim 1, wherein the information about the instantiation of the video player software application includes at least one of the dimensions, in pixels, of the video player, a resolution, in pixels, at which the second video will be played, an audio volume setting of the video player and a location of the instantiation of the video player software application relative to the current viewable area of the page of the website within the user's browser.

5. The method of claim 1, wherein the received information that enables the video player software application to obtain and play the first video comprises a URL at which the first video can be accessed or obtained.

6. The method of claim 1, wherein the bid request also includes an identification of a publisher of the website.

7. The method of claim 1, wherein the sending, receiving and comparing steps are performed before the user issues a play command.

8. The method of claim 1, wherein the sending, receiving and comparing steps are performed immediately after or while the initialization procedures are performed and without the need for the user to issue a play command.

9. The method of claim 1, wherein the sending step comprises sending the bid request to first and second video providers, wherein the receiving step comprises receiving first and second bids for playing a first video to the user from the first and second video providers, respectively, wherein the comparing step comprises comparing the bid prices received from the first and second video providers to the preset floor value, and wherein the playing step comprises:
    playing a first video identified in the bid received from the first video provider when the user issues a play command and when the bid price received from the first video provider is greater than the bid price received from the second video provider and where the bid price received from the first video provider also is equal to or greater than the preset floor price, and thereafter playing the second video to the user; and
    playing a first video identified in the bid received from the second video provider when the user issues a play command and when the bid price received from the second video provider is greater than the bid price received from the first video provider and where the bid price received from the second video provider also is equal to or greater than the preset floor price, and thereafter playing the second video to the user.

10. The method of claim 1, further comprising the steps of:
    sending a bid request to an alternate video provider when the bid price received from the at least one video provider is lower than the preset floor value;
    receiving, from the alternate video provider, a bid for playing a first video to the user, where the bid includes a price that the alternate video provider will pay to have the first video played to the user, and information that enables the video player software application to obtain and play the first video to the user; and
    playing the first video to the user when the user issues a play command, and thereafter playing the second video to the user.

11. The method of claim 10, wherein the step of sending a bid request to an alternate video provider and the step of receiving a bid from the alternate video provider are performed before the user issues the play command.

12. The method of claim 10, wherein the step of sending a bid request to an alternate video provider and the step of receiving a bid from the alternate video provider are performed immediately after the comparing command is performed and without the need for the user to issue a play command.

13. A system for obtaining and playing a first video in connection with the play of a second video, comprising:
    means for performing initialization procedures when the video player software application is instantiated as part of a process of rendering a page of a website on a user's browser, wherein the initialization procedures include identifying at least a title of a second video that will be played by the video player software upon receiving a play command from the user;
    means for sending a bid request to at least one video provider, where the bid request includes information about the second video and information about the instantiation of the video player software application on the rendered page of the website;

means for receiving from at least one video provider, a bid for playing a first video to the user, where the bid includes a price that the at least one video provider will pay to have the first video played to the user, and information that enables the video player software application to obtain and play the first video to the user;

means for comparing the bid price received from the at least one video provider to a preset floor value; and means for playing the first video to the user when the user issues a play command and when the bid price received from the at least one video provider is equal to or greater than the preset floor price, and thereafter playing the second video to the user.

14. A system for obtaining and playing a first video in connection with the play of a second video, comprising:

a data acquisition unit that performs initialization procedures when a video player software application is instantiated as part of a process of rendering a page of a website on a user's browser, wherein the initialization procedures include determining at least a title of a second video that will be played by the video player software upon receiving a play command from the user;

a bid request unit that sends a bid request to at least one video provider, where the bid request includes information about the second video and information about the instantiation of the video player software application on the rendered page of the website;

a bid analysis unit that receives, from at least one video provider, a bid for playing a first video to the user, where the bid includes a price that the at least one video provider will pay to have the first video played to the user, and information that enables the video player software application to obtain and play the first video to the user, and wherein the bid analysis unit also determines if the bid price received from the at least one video provider is equal to or greater than a preset floor value; and a player unit that plays the first video to the user when the user issues a play command and when the bid price received from the at least one video provider is determined to be equal to or greater than the preset floor price, and wherein the player unit thereafter plays the second video to the user.

15. The system of claim 14, wherein the bid request sent by the bid request unit includes a title of the second video.

16. The system of claim 14, wherein the bid request sent by the bid request unit includes information describing or characterizing the content of the second video.

17. The system of claim 14, wherein the information about the instantiation of the video player software application includes at least one of the dimensions, in pixels, of the video player, a resolution, in pixels, at which the second video will be played, an audio volume setting of the video player and a location of the instantiation of the video player software application relative to the current viewable area of the page of the website within the user's browser.

18. The system of claim 14, wherein the received information that enables the video player software application to obtain and play the first video comprises a URL at which the first video can be accessed or obtained.

19. The system of claim 14, wherein the bid request sent by the bid request unit also includes an identification of a publisher of the website.

20. The system of claim 14, wherein the bid request unit sends the bid request, the bid analysis unit receives a bid for playing a first video to the user, and the bid analysis unit determines if the bid price received from the at least one video provider is equal to or greater than a preset floor value before the user issues a play command.

21. The system of claim 14, wherein the bid request unit sends the bid request, the bid analysis unit receives a bid for playing a first video to the user, and the bid analysis unit determines if the bid price received from the at least one video provider is equal to or greater than a preset floor value all occurs immediately after or while the data acquisition unit performs initialization procedures, and without the need for the user to issue a play command.

22. The system of claim 14, wherein the bid request unit sends the bid request to first and second video providers, wherein the bid analysis unit receives first and second bids for playing a first video to the user from the first and second video providers, respectively, wherein the bid analysis unit compares the bid prices received from the first and second video providers to the preset floor value, and wherein:

the video player plays a first video identified in the bid received from the first video provider when the user issues a play command and when the bid price received from the first video provider is greater than the bid price received from the second video provider and where the bid price received from the first video provider also is determined to be equal to or greater than the preset floor price, and thereafter plays the second video to the user; and the video player plays a first video identified in the bid received from the second video provider when the user issues a play command and when the bid price received from the second video provider is greater than the bid price received from the first video provider and where the bid price received from the second video provider also is determined to be equal to or greater than the preset floor price, and thereafter plays the second video to the user.

23. The system of claim 14, wherein:

the bid request unit sends a second bid request to an alternate video provider when the bid analysis unit determined that the bid price received from the at least one video provider is lower than the preset floor value;

the bid analysis unit receives from the alternate video provider, a second bid for playing a first video to the user, where the second bid includes a price that the alternate video provider will pay to have the first video played to the user, and information that enables the video player software application to obtain and play the first video to the user; and the player unit plays the first video identified in the second bid to the user when the user issues a play command, and thereafter plays the second video to the user.

24. The system of claim 23, wherein the bid request unit sends the second bid request to the alternate video provider and the bid analysis unit receives the second bid from the alternate video provider before the user issues the play command.

25. The system of claim 23, wherein the bid request unit sends the second bid request to the alternate video provider and the bid analysis unit receives the second bid from the alternate video provider immediately without the need for the user to first issue a play command.

26. The method of claim 1, further comprising:

sending a second bid request to the at least one video provider when the bid price received from the at least one video provider is below the preset floor price, where the second bid request includes information indicating that the second bid request is a second bid request;

receiving from at least one video provider, a second bid for playing a first video to the user, where the second bid includes a price that the at least one video provider will pay to have the first video played to the user, and information that enables the video player software application to obtain and play the first video to the user;

comparing the second bid price received from the at least one video provider to a preset floor value; and playing the first video to the user when the user issues a play command and when the second bid price received from the at least one video provider is equal to or greater than the preset floor price, and thereafter playing the second video to the user.

27. The system of claim 14, wherein the bid request unit sends a second bid request to at least one video provider when the bid price received from the at least one video provider is below the preset floor price, where the second bid request includes information indicating that the second bid request is a second bid request;

wherein the bid analysis unit receives, from at least one video provider, a second bid for playing a first video to the user, where the second bid includes a price that the at least one video provider will pay to have the first video played to the user, and information that enables the video player software application to obtain and play the first video to the user, and wherein the bid analysis unit also determines if the second bid price received from the at least one video provider is equal to or greater than a preset floor value; and wherein the player unit plays the first video to the user when the user issues a play command and when the second bid price received from the at least one video provider is determined to be equal to or greater than the preset floor price, and wherein the player unit thereafter plays the second video to the user.

28. A method performed by a video player software application for obtaining and playing a first video in connection with the play of a second video, comprising:

performing initialization procedures when the video player software application is instantiated as part of a process of rendering a page of a website on a user's browser, wherein the initialization procedures include identifying at least a title of a second video that will be played by the video player software upon receiving a play command from the user;

sending a bid request to at least one video provider, where the bid request includes information about the second video;

receiving from at least one video provider, a bid for playing a first video to the user, where the bid includes a price that the at least one video provider will pay to have the first video played to the user, and information that enables the video player software application to obtain and play the first video to the user;

comparing the bid price received from the at least one video provider to a preset floor value; and playing the first video to the user when the user issues a play command and when the bid price received from the at least one video provider is equal to or greater than the preset floor price, and thereafter playing the second video to the user;

wherein the sending, receiving and comparing steps are performed before the user issues a play command.

29. The method of claim 28, wherein the sending, receiving and comparing steps are performed immediately after or while the initialization procedures are performed and without the need for the user to issue a play command.

30. The method of claim 28, further comprising:

sending a second bid request to the at least one video provider when the bid price received from the at least one video provider is below the preset floor price, where the second bid request include information indicating that the second bid request is a second bid request;

receiving from at least one video provider, a second bid for playing a first video to the user, where the second bid includes a price that the at least one video provider will pay to have the first video played to the user, and information that enables the video player software application to obtain and play the first video to the user;

comparing the second bid price received from the at least one video provider to a preset floor value; and playing the first video to the user when the user issues a play command and when the second bid price received from the at least one video provider is equal to or greater than the preset floor price, and thereafter playing the second video to the user.

* * * * *